Dec. 23, 1958 J. D. SMITH 2,865,698

COIN CONTROLLED VENDING MACHINES

Filed Feb. 1, 1955 9 Sheets-Sheet 1

INVENTOR
John D. Smith
BY
Herbert S. Fairbanks
ATTORNEY

INVENTOR
John D. Smith
BY
Herbert S. Fairbanks
ATTORNEY

INVENTOR
John D. Smith
BY
Herbert B. Fairbanks
ATTORNEY

INVENTOR
John D. Smith
BY
Herbert S. Fairbanks
ATTORNEY

INVENTOR
John D. Smith
BY
Herbert S. Fairbanks
ATTORNEY

INVENTOR
John D. Smith
BY
Herbert S. Fairbanks
ATTORNEY

INVENTOR
John D. Smith
BY
Herbert L. Fairbanks
ATTORNEY

INVENTOR
John D. Smith
BY
Herbert S. Fairbanks
ATTORNEY

Dec. 23, 1958 J. D. SMITH 2,865,698

COIN CONTROLLED VENDING MACHINES

Filed Feb. 1, 1955 9 Sheets-Sheet 9

INVENTOR
John D. Smith
BY
Herbert S. Fairbanks
ATTORNEY

United States Patent Office 2,865,698

Patented Dec. 23, 1958

2,865,698

COIN CONTROLLED VENDING MACHINES

John D. Smith, Audubon, N. J., assignor to Horn & Hardart Company of New York, New York, N. Y., a corporation of New York Application February 1, 1955, Serial No. 485,549

13 Claims. (Cl. 312—35)

The object of my invention is to devise a novel coin controlled vending machine which, while primarily designed to vend articles of food, is adapted to vend any desired article.

The machine is of the type in which articles to be vended are displayed in separate compartments, each of such compartments having a coin controlled door for the delivery opening and a rear replenishing opening, the door of which is controlled by an attendant at the rear of the vending machine.

A further object of the invention is to devise novel article conveying mechanism controlled by the coin mechanism so that on the insertion into the machine of coins of a predetermined total value the front delivery opening will have its door moved into and retained in its open position and an article support will move forwardly and project through the delivery opening and bringing the article purchased into convenient position for removal from the article support.

A further object of the invention is to devise a novel construction and arrangement of main and auxiliary counter-weights connected with the door of a delivery opening to effect its opening and closing movements. The auxiliary counter-weights contribute with the main counter-weights to initially overcome the mass inertia of the door in its opening movement and the main counter-weights then continue their movements to complete the full opening of the door for the delivery opening.

A further object of the invention is to connect the main counter-weights with the door for the delivery opening and with the article support, whereby the article support will be moved in timed relationship with the opening and closing of the door.

Other novel features of construction and arrangement of the component parts will hereinafter clearly appear in the detailed description and the appended claims.

With the foregoing in view, my invention comprehends a novel vending machine.

For the purpose of illustrating the invention, I have shown in the accompanying drawings a preferred embodiment of it, which I have found in practice to give satisfactory and reliable results. It is, however, to be understood that the various instrumentalities of which the invention consists can be variously arranged and organized and the invention is not limited except by the scope of the appended claims to the exact arrangement and organization of these instrumentalities as herein set forth.

Similar numerals of reference indicate corresponding parts.

Figure 1:
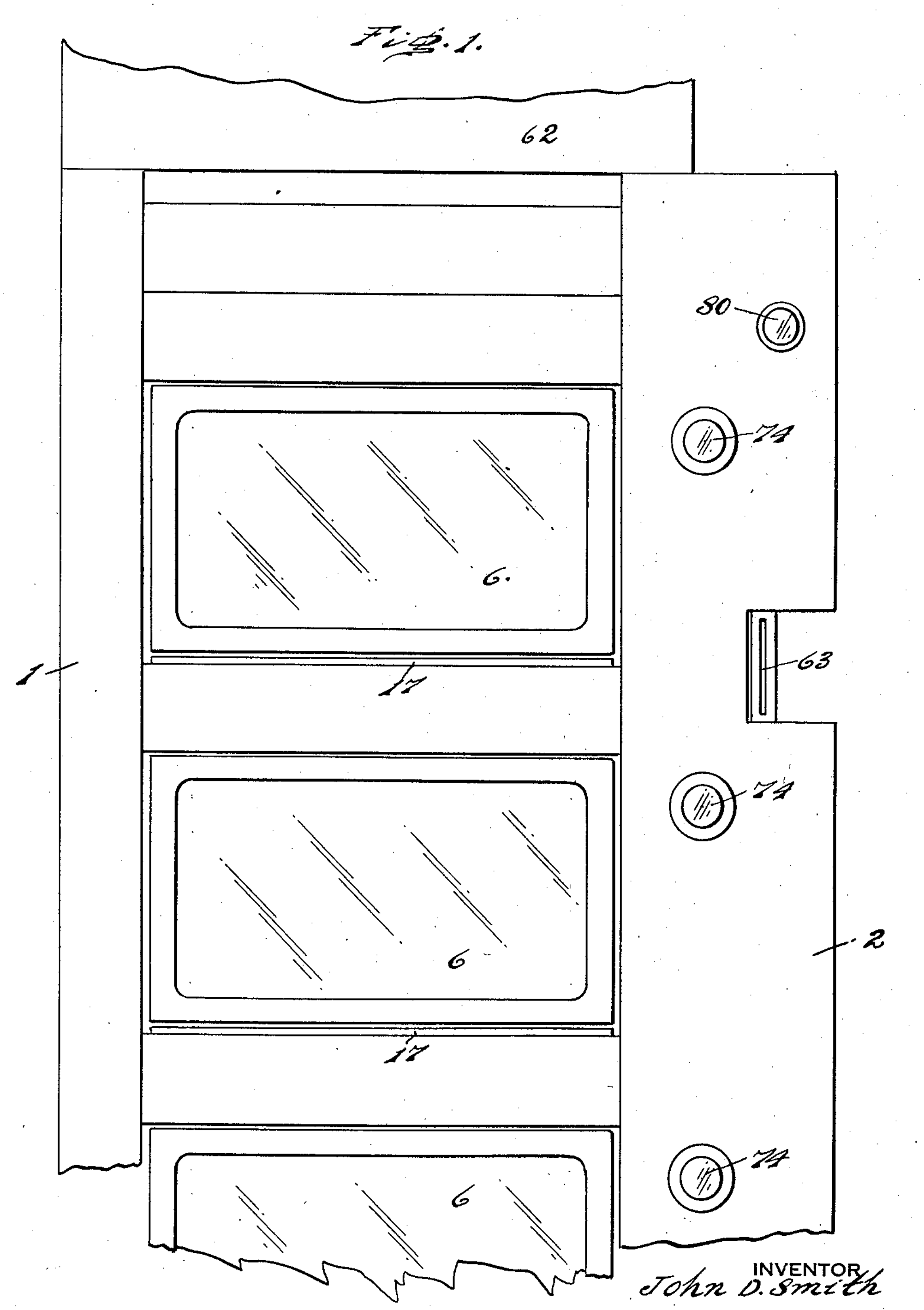
Figure 1 is a front elevation, partly broken away, of a vending machine embodying my invention.

Referring to the drawings:

The vending machine herein disclosed is made up of a desired number of sections, each section having a plurality of vending compartments which may be arranged one above another, and in the drawings one section is illustrated.

The machine cabinet or casing has flanged sides 1 and 2, preferably of sheet metal, and the sides are secured in spaced relationship by cross bars or members 3, which contribute with the sides to form article receiving compartments 4. Each compartment 4 has a front delivery opening 5 with a door 6 controlling access to the opening, and each compartment has a rear replenishing opening 7 and a rear door 8 which controls the replenishing opening.

The rear door 8 is hinged at its upper portion to the casing and is manually opened by an attendant in rear of the casing when it is desired to replenish the compartment.

The rear door has flanges at its sides which are cut-away to form stops 9 which contact the casing when the door is raised to limit upward swinging movement of it. A rod 10 connected with the flanges serves as a handle for operating the rear door. The rear door which forms the back of a compartment has on its front face flanges 11 to receive a replaceable color sheet 12 which is colored to conform to that of the food to be vended.

The front door is flanged and such flanges have fixed to them a rod 13 provided with weights 14, and this rod extends through slots 15 in the sides 1 and 2 of the casing.

Each compartment is provided with a movable bottom which forms an article support as will later be described.

*Article dispensing mechanism*

The cross members 3 of the casing are connected by pairs of bearing rods 15′ on which slides 16 are movably mounted, and on these slides an article support 17 is fixed by fastening devices 18. The article supports are in the form of flat plates having a curved cut-out at their front ends to facilitate the removal of a vended article. Headed rods 19 are fixed to the slides and extend through slots 20 in the sides 1 and 2 of the casing.

The front door 6 is moved in unison with the movement of the article support, and is connected by studs 21, passing through the curved slots 15 in the sides of the casing, with main counter-weights 23 pivotally mounted at 22 on brackets 24 secured in spaced relationship with the sides of the casing. The counter-weights 23 are retained in their upward position when the front door is closed by detents 25 in the form of levers which pass through vertically directed slots 26 in the sides of the casing. These detents contact the upper rear portion of the counter-weights to retain them in raised position when the front door is closed and the article support is in its normal position within its compartment. The detents can be released by the insertion into the machine of coins of a predetermined total value, and can be manually released by an attendant in rear of the machine as will hereinafter be explained.

The main counter-weights have the upper ends of arms 27 mounted on their pivots and these arms have slots 28 opening through their lower ends to receive the headed rods 19 fixed to the slides 16 which carry the article support 17.

The arms 27 are in the path of movement of studs 29 on a side wall of the main counter-weights to cause their forward movement and the forward movement of the article support, and are in the path of movement of studs 30 on a wall of the counter-weights 23 to cause the rearward movement of the arms, and the return of the article support into its initial position within its compartment.

To assist the initial downward movement and overcome inertia of the main counter-weights, auxiliary counterweights 31 are provided which ride on rollers 32 mounted on the side walls of the main counter-weights. These auxiliary counter-weights have their front ends pivoted on studs 33 on side walls of the casing and are shaped to form stops 34, which contact the brackets 24 on a predetermined downward movement of the main counter-weights. The auxiliary counter-weights have slots 35 extending laterally and in which weights 36 are adjustably secured. These weights 36 provide for a precise weight action on the main counter-weights by the auxiliary counter-weights.

*Manual closing of the front door*

The front door 6 should be closed when its compartment is to be replenished, and the article support 17 should be within its compartment. For this purpose, a novel construction and arrangement of sectional links 37 is provided having rear link sections 38 pivotally connected at their rear ends to a rear door, and having front link sections 39 pivotally connected to the main counter-weights 23 by pivots 87 on the counter-weights 23 and slots 88 in the front link sections 39. The rear end of a front link section is in the form of a rod 40 telescoping into a rear link section 38 and having a nut 41 at its free end forming an abutment for a spring 42 encircling the rod and abutting against a nut 43 at the front end of a rear link section, see Figures 17 and 18, and 4 and 7.

The action of this linkage between the rear door and the main-counter-weights and its purpose are to provide a safety linkage between the rear door, main counter-weights 23 and the front door, adjustable to adjust the extent of opening of the front door, and to prevent injury to the hand or fingers of a purchaser if they extend into the delivery opening during the closing of the front door. The spring permits expansion of the linkage during the final closing movement and the rear door stop limits upward movement of the front door. The sectional link 37 is connected by a pin and slot connection 87 and 88 with a counter-weight.

*Signalling mechanism to attendant*

Figure 6:
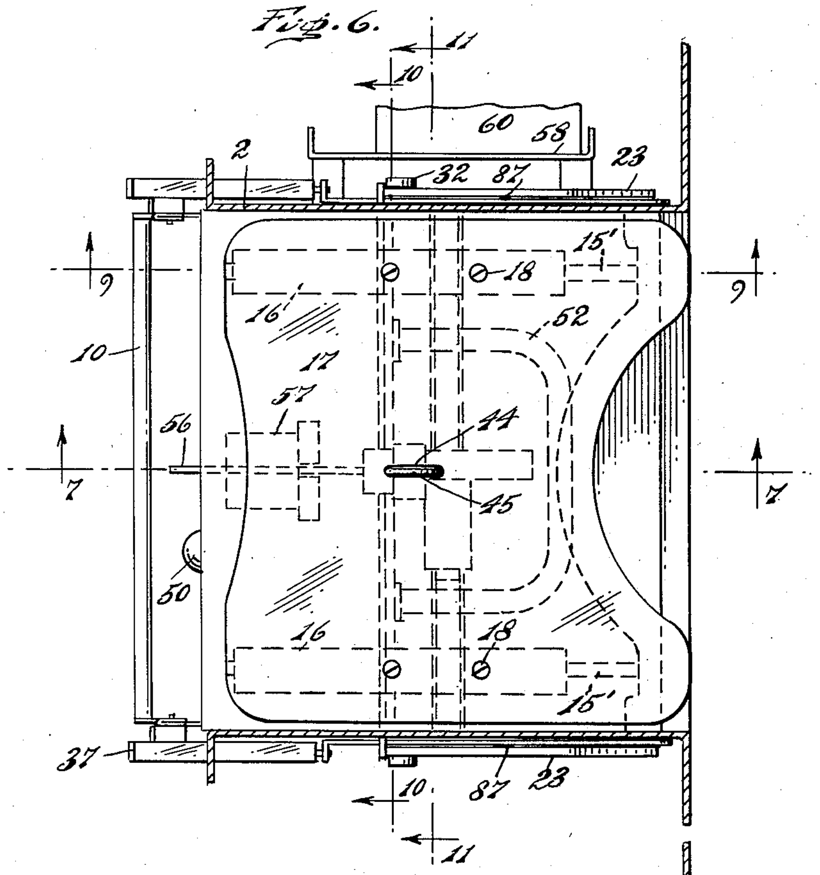
Figure 6 is a transverse section through an article receiving compartment, the section being taken on line 6—6 of Figure 7.
Figure 12:
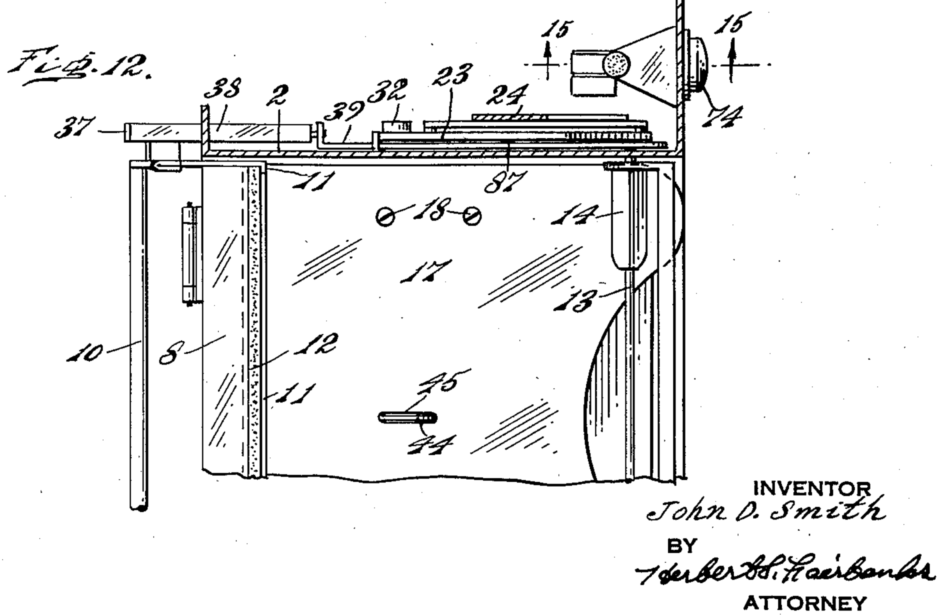
Figure 12 is a section on line 12—12 of Figure 7, the view being taken looking downwardly on the counter-weights and their cooperating parts.
Figure 7:
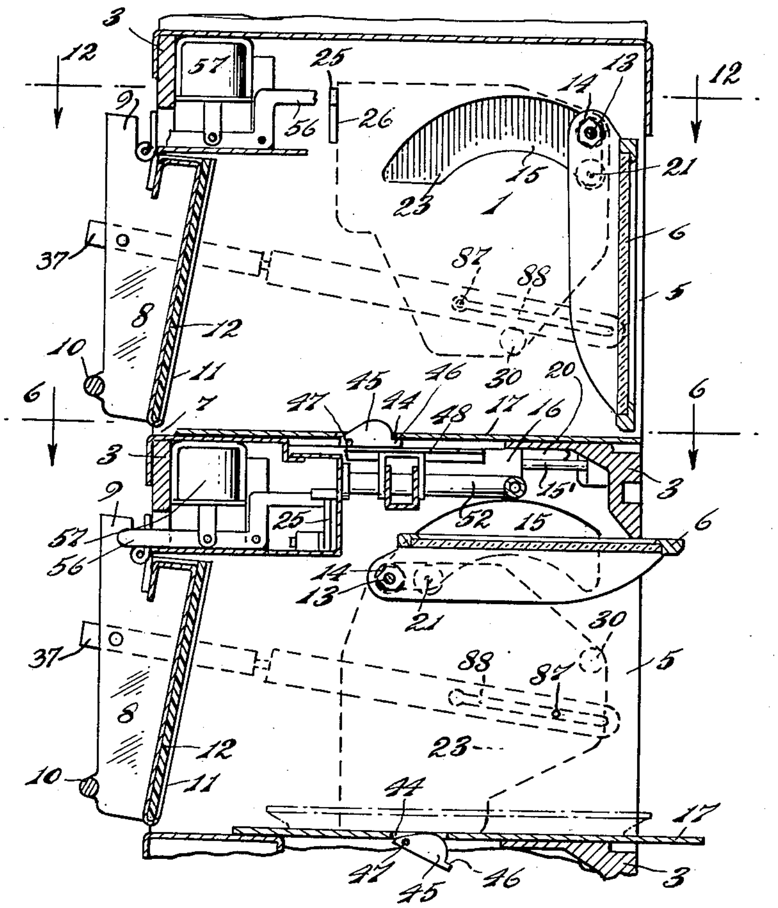
Figure 7 is a section on line 7—7 of Figure 6, showing more particularly signalling mechanism indicating whether or not an article receiving compartment is empty.
Figure 8:
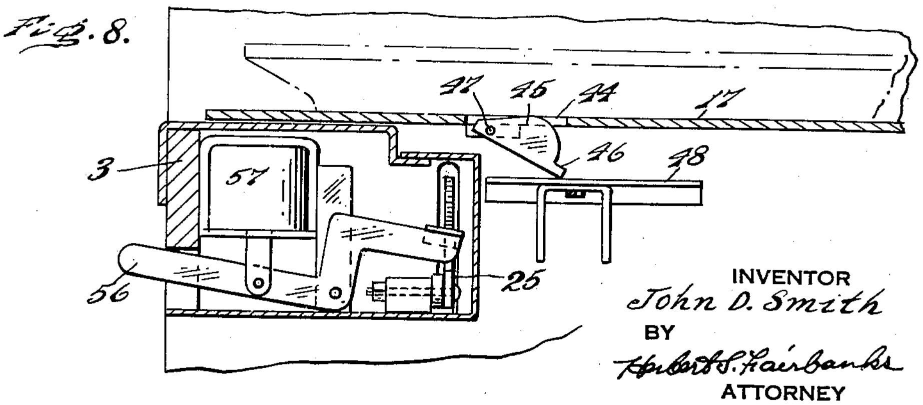
Figure 8 is an enlarged sectional view, taken on the same section line as Figure 7.
Figure 9:
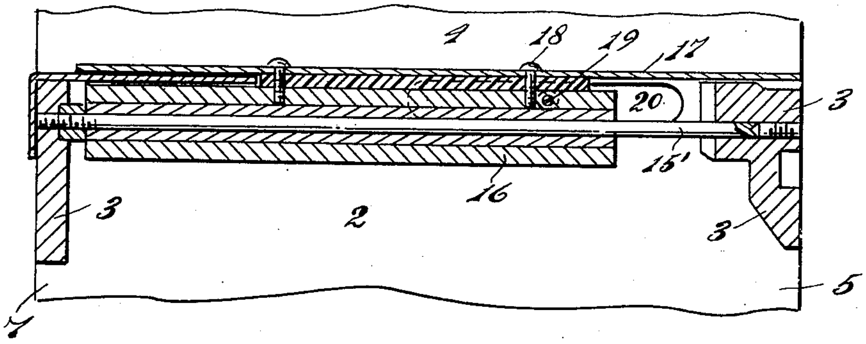
Figure 9 is a section on line 9—9 of Figure 6, showing an article support on one of its slides and a bearing member for the slide.

The article support 17, see Figs. 6, 7 and 8, has a centrally located slot 44 into which a lever 45 extends, the lever having a stop 46 limiting its upward movement and pivoted at 47 to the bottom of the article support, the lever bearing against a pivoted strip 48 controlling a switch 49, which, in turn, controls a light 50. A spring 51 retains the lever 45 in raised position in its slot. An article in a compartment resting on a lever 45 depresses it to open the light circuit, and when the article is removed the switch is energized and the light circuit closed.

Temperature changing means may be provided in the compartments, and I have shown a heating element 52 beneath an article support and controlled by a switch 53 at the rear of the machine.

A manually actuated detent lever 56 extends through a slot in the rear wall of the machine and its other end extends over the inner ends of detent levers 25 which latter are automatically controlled by a solenoid 57 controlled by the coin mechanism and a price selector. A lever 56 is pivotally connected with its solenoid.

*The coin mechanism*

Figure 3:
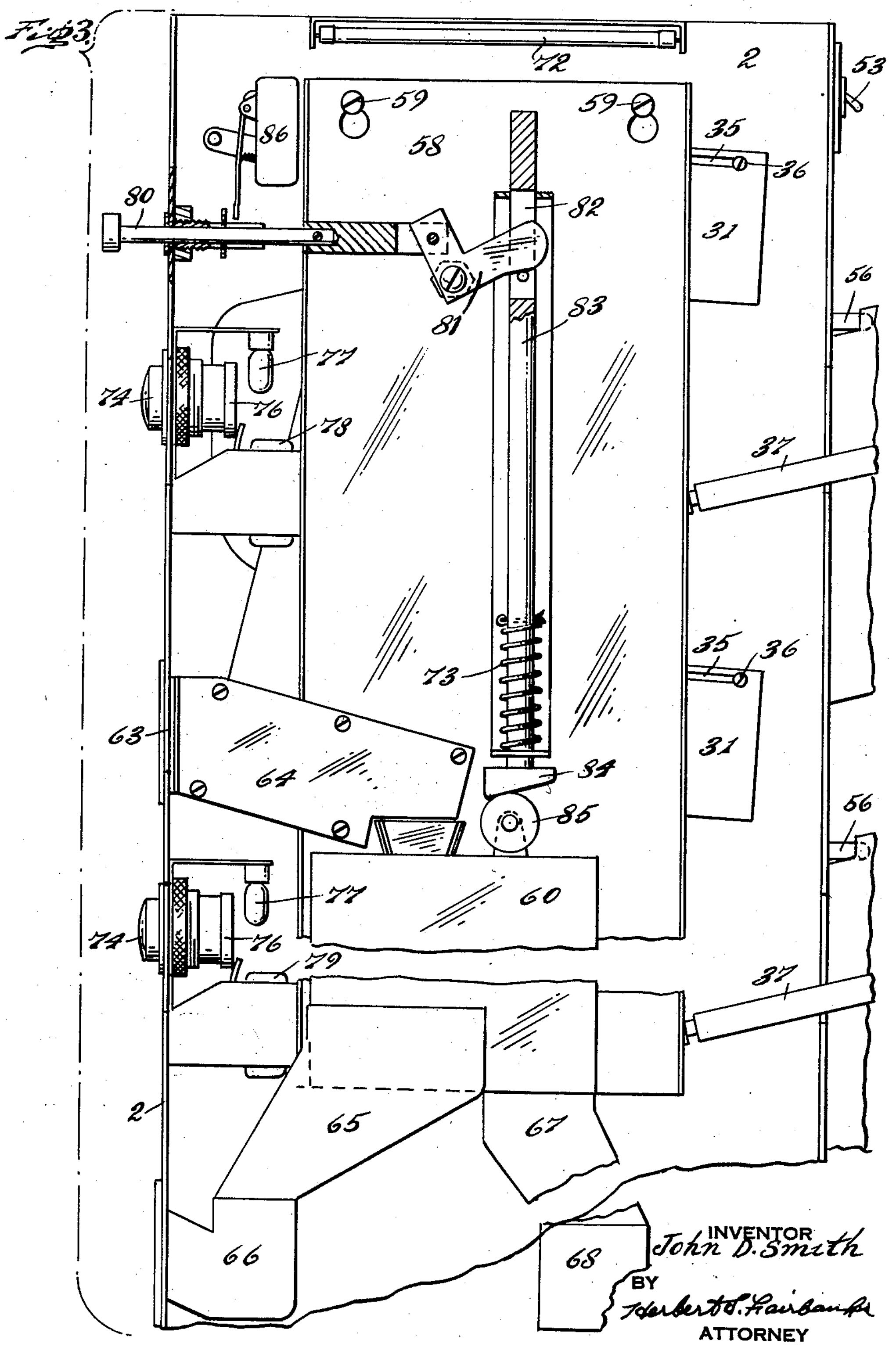
Figure 3 is a side elevation, partly broken away, showing the right hand side of the vending machine.

A mounting plate 58 is removably carried by studs 59 at one side of the casing, and a coin unit 60 is removably mounted on the plate 58, see Figure 3. This unit includes a single coin unit and separate price selectors, one for each compartment, are employed, since the sales price for the articles in the different compartments may be different.

Figure 13:
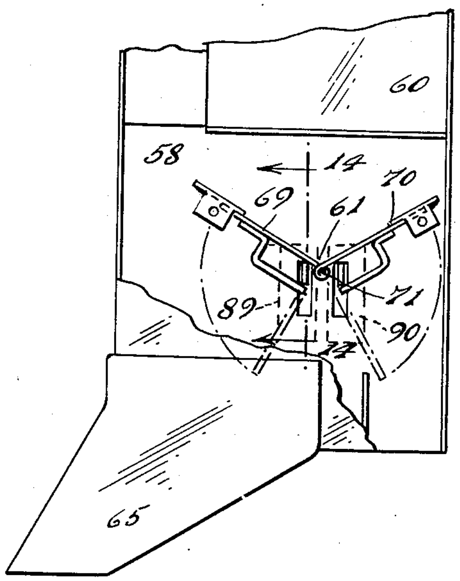
Figure 13 is a side elevation, partly broken away to show a coin receiving pocket of the coin mechanism.
Figure 14:
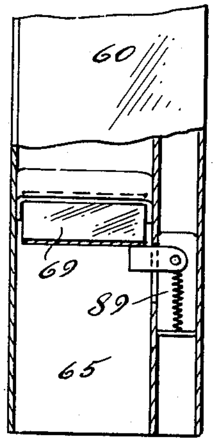
Figure 14 is a section on line 14—14 of Figure 13.

The front wall of the casing has a coin receiving slot 63 which leads to a chute 64 which discharges into the inlet of the coin mechanism. A return passage 65 leads to a return coin pocket 66 opening through the front wall of the casing, and the coin unit has a passage 67 leading to a money receiving box 68. In advance of the passages 65 and 67, a V-shaped coin pocket 61 is provided having a solenoid controlled side 69 and a solenoid controlled side 70. These sides are pivoted at 71 to each other and tensioned to be normally closed as seen in Figure 13. The side 69 when opened discharges into return passage 65, and the side 70 when opened discharges into passage 67. Lights 72 are mounted at the upper opposite sides of the casing.

*Price selecting mechanism for the coin unit*

Each compartment is provided with a separate price selector 62, and each compartment has its selector button 74 extending through the front wall of the casing. The button 74 is of Plexiglas and lights only on selection.

Figure 15:
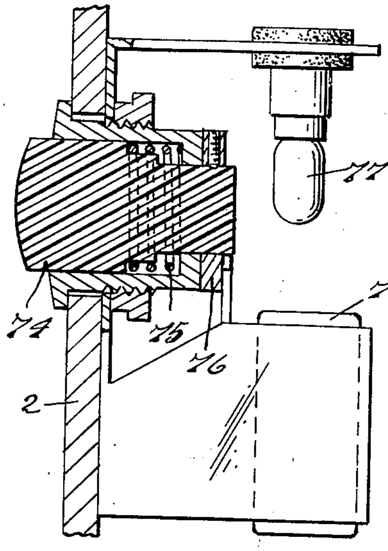
Figure 15 is a section on line 15—15 of Figure 12.
Figure 16:
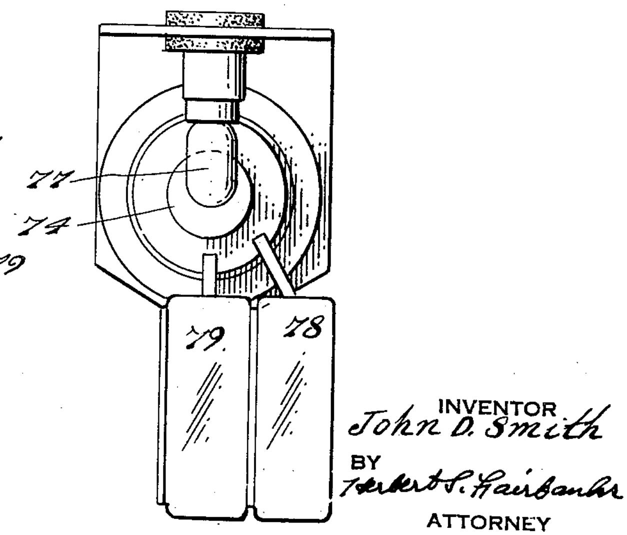
Figure 16 is an end elevation of Figure 15.

The selector buttons 74 have springs 75, tending to move them towards the front of the casing, and a shoulder 76 to limit such movement. When a selector button is pushed inwardly, it actuates a switch 78 to control a light 77 which lights up such button, and also actuates a switch 79 which sets into condition for operation the price selector corresponding to the selected button, see Figures 15 and 16. Each price selector has a graduated disc 54 and a stop pin 55 which can be set for a predetermined value of coins, and controls the extent of rotation of a toothed disc 91, see Figure 5.

*Mechanism for clearing the coin mechanism of coins*

A push rod 80 extends through the front wall of the casing and is connected at its inner end with an elbow lever 81, the free end of which extends into a slot 82 in a vertically movable rod 83 having at its lower end a cam 84 which rides on a roller 85 which controls the opening of pivoted portions of the coin chute and passages. Such opening of the pivoted portions of the coin unit permits the coins retained therein to discharge into the passage 65 and therefrom into the pocket 66 opening through the front wall of the casing. The rod 83 is tensioned by a spring 73.

*The operation*

Assuming now that the articles to be vended have been placed in the compartments and the price selectors set for the predetermined sales price for each article, and the front doors are closed and locked, the intending purchaser looks through the transparent front doors and determines the compartment he desires to open. He then pushes in the selector button 74 which corresponds to the selected compartment.

Figure 2:
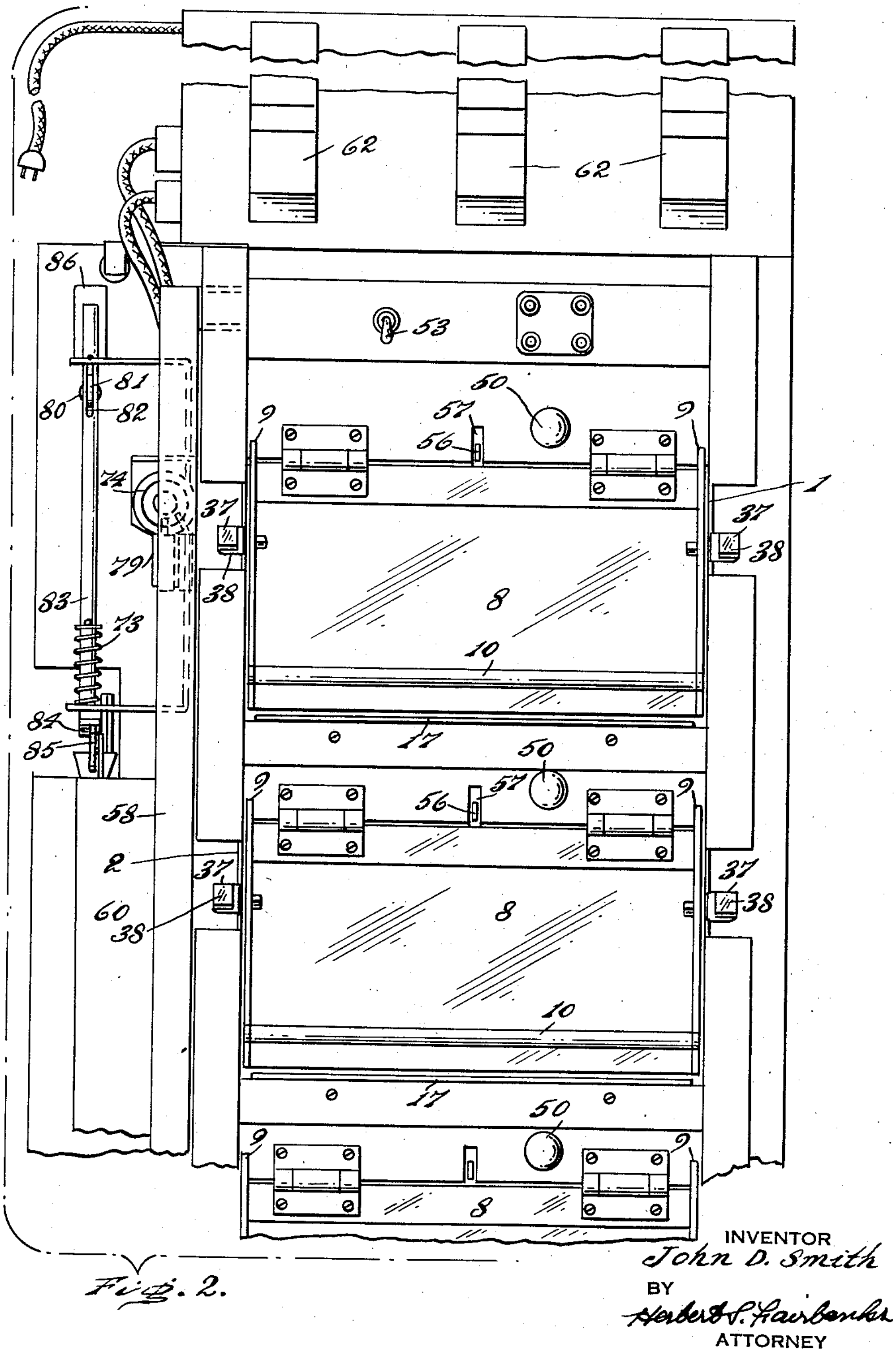
Figure 2 is a rear elevation, partly broken away, of the vending machine.
Figure 5:
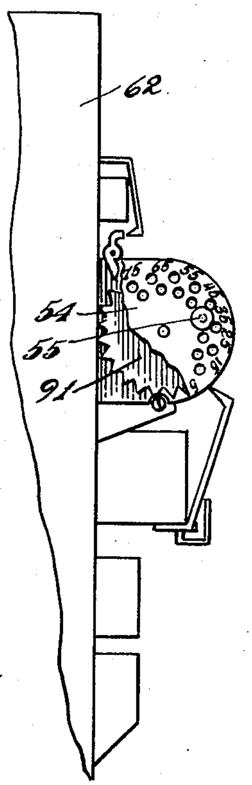
Figure 5 is a side view of a price selector with its cover removed.
Figure 10:
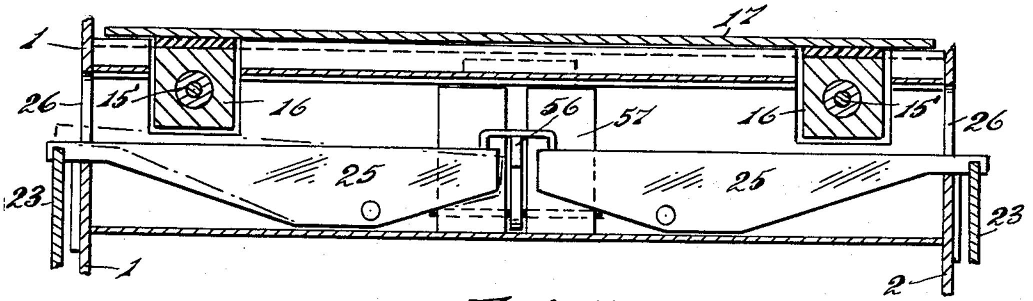
Figure 10 is a section on line 10—10 of Figure 6, showing the article support, its slides and their bearings, and a detent for the main counter-weight.
Figure 11:
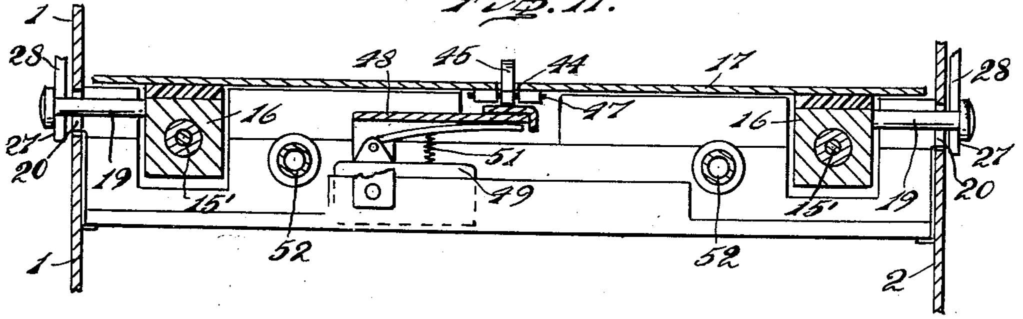
Figure 11 is a section on line 11—11 of Figure 6, showing the connection of the slides to their operating links, and showing signal mechanism to indicate that a compartment is empty.

The selector button 74 actuates a switch for the light 77 and also a switch 79, see Figure 3, which selects the price selector 62, see Figures 2 and 5, corresponding to the compartment selected. The customer now inserts the coins in any order which total the sales price, and these coins, see Figure 3, pass through the coin chute 64 to the coin mechanism 60 and are received in the coin receiving pocket 61, see Figure 13. If the coins total the sales price as determined by the price selector the solenoid 90 is energized to move downwardly the pivoted side 70 and the coins pass through the chute 67 to the money receiving box 68, see Figure 3. At this time, the solenoid 57 is energized, see Figures 6, 7 and 8, to raise the outer ends of the detent levers 25, see Figure 10, to move them out of contact with the main counter-weights 23, thereby permitting such counter-weights to swing downwardly on their pivots. Since the front door to a compartment is fixed to counter-weights 23, the selected door will swing upwardly to its open position and be retained in its open position.

Figure 4:
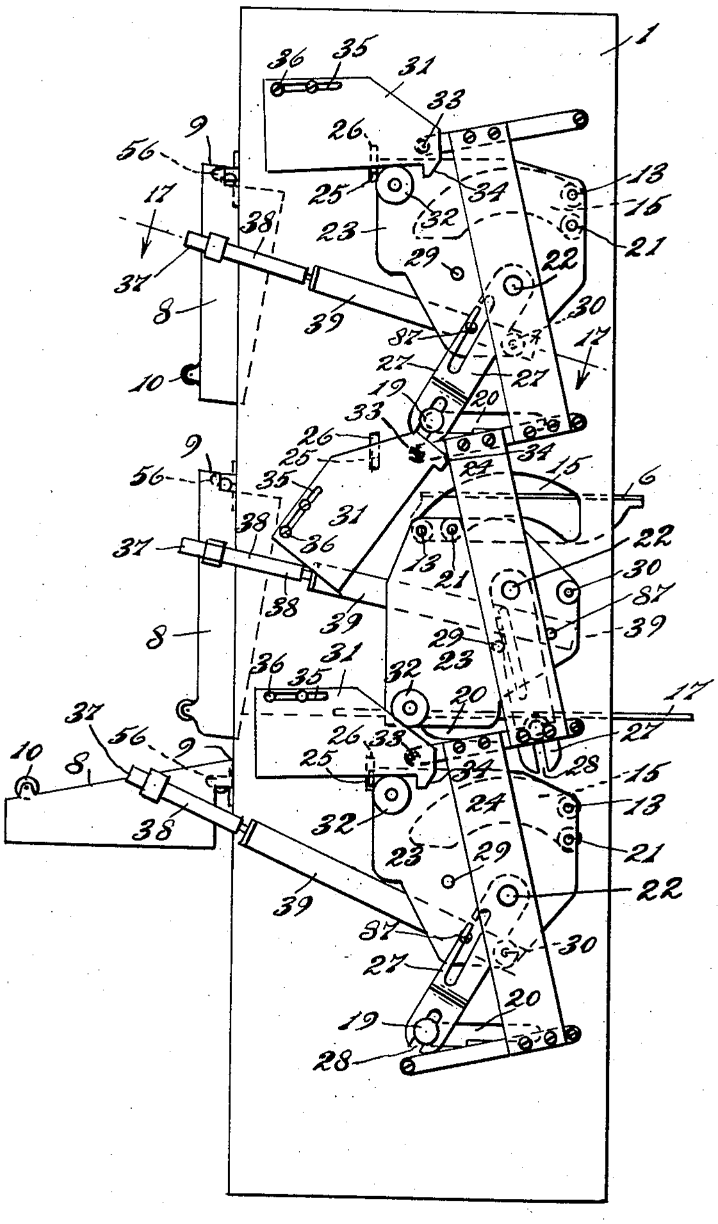
Figure 4 is a side elevation of a portion of the vending machine, showing more particularly counter-weights for the front door and their connection to the rear door.

The auxiliary counter-weights 31, riding on the rollers 32 move downwardly on their pivots during only the initial downward movement of the main counter-weights 23 since their stop portions 34 contact the brackets 24, see Figure 4.

The arms 27 are in the path of studs 29 on the counter-weights 23, so that on the downward swinging of the counter-weights 23, the slides connected with the arms by a pin and slot connections are moved forwardly together with the article support 17 to project its front portion through the delivery opening.

The plate or platter carrying the article to be vended rests on the switch actuating member 45 to depress it.

Figure 17:
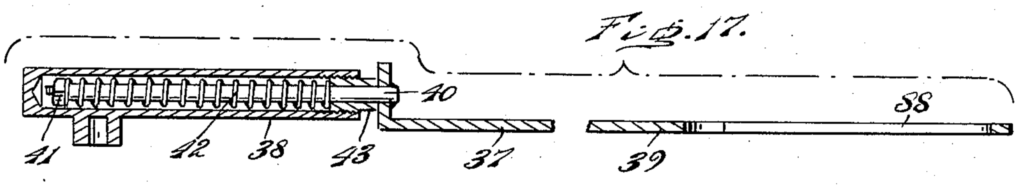
Figure 17 is a longitudinal section of a flexible linkage connecting the rear door with a main counter-weight.
Figure 18:
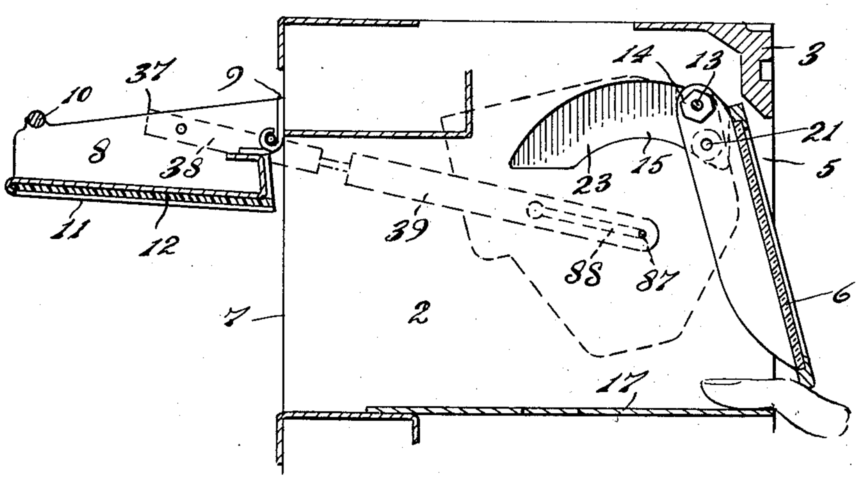
Figure 18 is a side elevation, partly in section, showing a flexible linkage between a main counter-weight and a rear door for preventing injury to a customer if his hand extends into the front door opening during the final closing movement of the front door.

When the plate, platter or container is removed from its compartment, the tensioned members 45 and 48 move upwardly to cause the energization of switch 49 to cause the light 50 to light up and thereby indicate to the attendant in rear of the machine that the compartment is empty and should be refilled. The attendant now introduces a new sales article through the rear replenishing opening, and then sets the mechanism for the next operaiton. He raises the rear door upwardly, thereby drawing rearwardly the sectional links 37, which have a pin and slot connection with the main counterweights 23, and swinging upwardly the main counter-weights to engage the detent levers 25. During this operation, the front door is moved into its closed position. The stop portion 9 of a rear door contacts the rear wall, of the casing, and spring 42, see Figure 17, is compressed so that the final closing movement of the front door is caused by the spring, which prevents injury in case the hand or fingers of the purchaser are extending into the delivery opening.

The arms 27 are in the path of studs 30 on the main counter-weights 23 which move the arms 27 rearwardly and thereby the rods 19, slides 16 and article support 17 to return the article support into its compartment.

The attendant in rear of the machine can inspect a compartment without opening the front door by opening the rear door due to the pin and slot connection of links 37 with the main counter-weights 23. The attendant can manually release the detent levers 25 by moving the lever 56 upwardly to cause its inner end to press downwardly on the inner ends of the levers 25, thereby releasing the counter-weights 23 which latter will swing downwardly and move the front door into its open position.

As before explained, if the purchaser inserts the proper value of coins for a selected compartment, such coins pass to the coin receiver 61, and the coin selector for such compartment having determined that the proper value has been deposited causes the solenoid 90 to be energized and the side 70 to open and the release of the detent levers 25 to cause the opening of the front door and the forward movement of the article support into a position readily accessible to the purchaser.

If, however, the intending purchaser does not insert into the coin slot 63 sufficient coins to total the purchase price as determined by the price selector for the selected compartment, then, by pressing inwardly the push rod 80, the solenoid 89 is actuated to move downwardly the pivoted side 69 of the coin receiver 61 by energizing switch 86, see Figure 3, which in turn energizes the solenoid 89, and the released coins pass into return chute 65 and to pocket 66 opening through the front wall of the machine.

The machine will operate with a single set of counter-weights, connections to the rear door and article support, but, in order to better balance the operation, a set is provided at opposite sides of a compartment.

Although not limited to such use, the vending machine is primarily designed for the sale of food in a cooked condition such as a platter luncheon or dinner.

Having thus described my invention, what I claim as new and desire to secure by Letters Patent is:

1. In a vending machine, a casing having a vending compartment with a delivery opening, a door for said opening, a counter-weight fixed to said door and pivotally supported offcenter, said counter-weight being in raised position when the door is closed, a detent engaged by the counter-weight when the latter is in raised position, an auxiliary counter-weight pivotally supported at one end and riding on the first counter-weight, and means operative on a predetermined downward movement of both counter-weights to arrest the downward movement of the auxiliary counter-weight to prevent its further cooperation with the first counter-weight during the continued downward movement of the first counter-weight, and coin controlled releasing means for said detent.

2. The construction defined in claim 1, wherein the first counter-weight has a roller on which the auxiliary counter-weight rides during the initial movement of the first counter-weight.

3. The construction defined in claim 1, wherein the means for arresting the downward movement of the auxiliary counter-weight has a stop portion cooperating with the casing to limit movement in one direction of the auxiliary counter-weight.

4. The construction defined in claim 1, wherein the auxiliary counter-weight has a slot and weighting means is adjustably mounted in said slot.

5. The construction defined in claim 1, having in addition an article support movably mounted in said compartment, a pair of spaced studs on said first counter-weight, a lever pivotally supported, disposed between said studs and connected with said article support to be moved by one stud to project said article support through said delivery opening and to be moved by the other stud to return said article support into said vending compartment.

6. In a vending machine, a casing having a compartment with a delivery opening, a door controlling said opening, a counter-weight pivoted offcenter at one side of the compartment and fixed to the door to open and close it, an article support movably mounted in said compartment, an arm pivotally supported and having a pin and slot connection with said article support, a stud on said counter-weight contacting with said arm to move it forwardly and thereby said article support, a second stud on said counter-weight contacting said arm to move it rearwardly to return the article support into said compartment, a detent to retain said counter-weight in raised position, and coin releasing means for said detent.

7. The construction defined in claim 6, wherein the compartment has a replenishing opening, a door for the replenishing opening, a sectional link having a pin and slot connection with said counter-weight and a pivotal connection with the door for the replenishing opening, a spring between sections of the link, and stop portions on the replenishing door and casing limiting opening movement of the replenishing door, whereby the link expands if a customer has his hand or fingers extending into the delivery opening, the final closing movement of the delivery door being effected by said spring.

8. In a vending machine, a casing having a vending compartment with a delivery opening, a door controlling said opening, bearing members at the bottom of said compartment, slides on said bearing members, an article supporting plate fixed to said slides, rods extending outwardly from the slides, counter-weights pivoted offcenter at opposite sides of the casing and fixed to the door, spaced studs on the counter-weights, arms pivotally supported at their upper ends and having slots to receive the rods, said arms being in the path of said studs to move said plate towards said delivery opening or in the opposite direction, detent levers retaining said counter-weights in raised position, and coin releasing means for said detent levers.

9. The construction defined in claim 8, having in addition a signal means controlled by the presence of an article on said article supporting plate and rendered inoperative when an article to be vended is on said plate and rendered operative when an article is not on said plate.

10. In a vending machine, a casing having a vending compartment with a delivery opening and a rearwardly facing opening, a door controlling said delivery opening, and having flanges at its rear portion, a rod connected with said flanges, weights on said rod, counter-weights pivotally supported at opposite sides of the casing and fixed to said door, a detent to retain the counter-weights in raised position, an article support in the compartment, spaced studs on the counter-weights, arms straddled by said studs and connected with said article support to project said article support through said delivery opening and to return said article support into its compartment, a rear door for the rearwardly facing opening of said compartment connected with said counter-weights to move them into raised position, and coin controlled means for said detent.

11. In a vending machine, a casing having an article receiving compartment with a delivery opening, a door controlling said opening, an article support movably mounted in said compartment to move through said opening, a counter-weight pivotally supported to swing downwardly and fixed to said door, a lever connected with said article support to move it into and out of said compartment, a stud on said counter-weight to contact said lever to move the article support forwardly, a second stud on said counter-weight to contact said lever to move the article support rearwardly, a detent retaining said counter-weight in raised position, and coin controlled means to release said detent.

12. The construction defined in claim 11, wherein a roller is mounted on said counter-weight and an auxiliary counter-weight is pivotally supported and rides on said roller to move with said first counter-weight, and a stop member in the path of movement of the auxiliary counter-weight to arrest its movement with the first counter-weight on a predetermined travel of the first counter-weight.

13. The construction defined in claim 11, wherein an auxiliary counter-weight rides on the first counter-weight, a stop member limits downward movement of the auxiliary counter-weight, said auxiliary counter-weight having a slot, and a weight adjustable in said slot.

References Cited in the file of this patent

UNITED STATES PATENTS

| | | |
|---|---|---|
| Re. 21,301 | Fry et al. | Dec. 19, 1939 |
| 659,105 | Sander | Oct. 2, 1900 |
| 1,079,967 | White | Dec. 2, 1913 |
| 1,178,935 | Morrison | Apr. 11, 1916 |
| 1,199,066 | Fritsche | Sept. 26, 1916 |
| 1,222,314 | Madsen | Apr. 10, 1917 |
| 1,257,869 | Jaeger | Feb. 26, 1918 |
| 1,315,248 | Soterakis | Sept. 9, 1919 |
| 1,322,450 | Jaeger | Nov. 18, 1919 |
| 1,345,499 | Meyfarth | July 6, 1920 |
| 1,435,440 | Zsoldos | Nov. 14, 1922 |
| 1,496,939 | Martin | June 10, 1924 |
| 2,052,685 | Wilson et al. | Sept. 1, 1936 |
| 2,406,516 | Treciokas | Aug. 27, 1946 |
| 2,529,196 | Stoner | Nov. 7, 1950 |
| 2,660,282 | Gross | Nov. 24, 1953 |
| 2,707,543 | Stoner et al. | May 3, 1955 |
| 2,719,528 | Gabrielsen | Oct. 4, 1955 |

FOREIGN PATENTS

| | | |
|---|---|---|
| 2,853 | Great Britain | of 1868 |